United States Patent [19]

Hansen

[11] Patent Number: 5,673,212

[45] Date of Patent: Sep. 30, 1997

[54] METHOD AND APPARATUS FOR NUMERICALLY CONTROLLED OSCILLATOR WITH PARTITIONED PHASE ACCUMULATOR

[75] Inventor: Robert Karl Hansen, Scottsdale, Ariz.

[73] Assignee: Motorola, Inc., Schaumburg, Ill.

[21] Appl. No.: 523,099

[22] Filed: Sep. 1, 1995

[51] Int. Cl.$^6$ .................................................. G06F 1/02
[52] U.S. Cl. .................................... 364/718; 364/721
[58] Field of Search ................................. 364/718, 119, 364/720, 721, 722; 375/718, 719, 720; 327/105, 106, 107

[56] References Cited

U.S. PATENT DOCUMENTS

| | | | |
|---|---|---|---|
| 4,241,308 | 12/1980 | Lovelace et al. | 328/55 |
| 4,486,846 | 12/1984 | McCallister et al. | 364/607 |
| 4,514,696 | 4/1985 | Genrich | 328/14 |
| 4,855,946 | 8/1989 | Ruben et al. | 364/721 |
| 4,951,237 | 8/1990 | Essenwanger | 364/721 |
| 4,992,743 | 2/1991 | Sheffer | 327/106 |
| 5,031,131 | 7/1991 | Mikos | 364/721 |
| 5,073,869 | 12/1991 | Bjerede | 364/718 |
| 5,142,487 | 8/1992 | Graham, III | 364/721 |
| 5,371,765 | 12/1994 | Guilford | 375/119 |
| 5,519,343 | 5/1996 | Britz | 327/106 |

OTHER PUBLICATIONS

An article entitled "A 150-MHz Direct Digital Frequency Synthesizer in 1.25-um CMOS with -90-dBc Spurious Performance" by H. T. Nicholas, III et al., *IEEE Journal of Solid-State Circuits*, vol. 26. No. 12, Dec. 1991, pp. 1959-1969.

A catalog entitled "ASIC & Custom Products—Short Form Catalog", Published by Stanford Telecommunication, Inc., ASIC & Custom Products Division, ©1993, Stanford Telecommunications, Inc., Aug., 1993.

*Primary Examiner*—Reba I. Elmore
*Assistant Examiner*—Chuong D. Ngo
*Attorney, Agent, or Firm*—Jeffrey Nehr; Bradley J. Botsch, Sr.

[57] ABSTRACT

A numerically controlled oscillator (NCO) (10) or direct digital synthesizer (DSS) includes a phase accumulator (12, 28, 30), a phase to amplitude converter (24), and a digital to analog converter (26). The phase accumulator is partitioned into a high speed phase accumulator stage (44) and a low speed phase accumulator stage (46). The high speed stage (44) performs modulo accumulation on the most significant $N_M$ bits of the entire phase word. The low speed stage (46) performs modulo accumulation on the least significant $N_L$ bits of the entire phase word. The low speed stage (46) supplies a carry signal to the high speed stage (44). The low speed stage (46) operates with an accumulation period that is $2^X$ times slower than the accumulation period for the high speed stage (44). A phase output is taken from the most significant $N_p$ of the $N_M$ bits accumulated in the high speed stage (44), where desirably $N_M \geq N_p + X$.

20 Claims, 2 Drawing Sheets

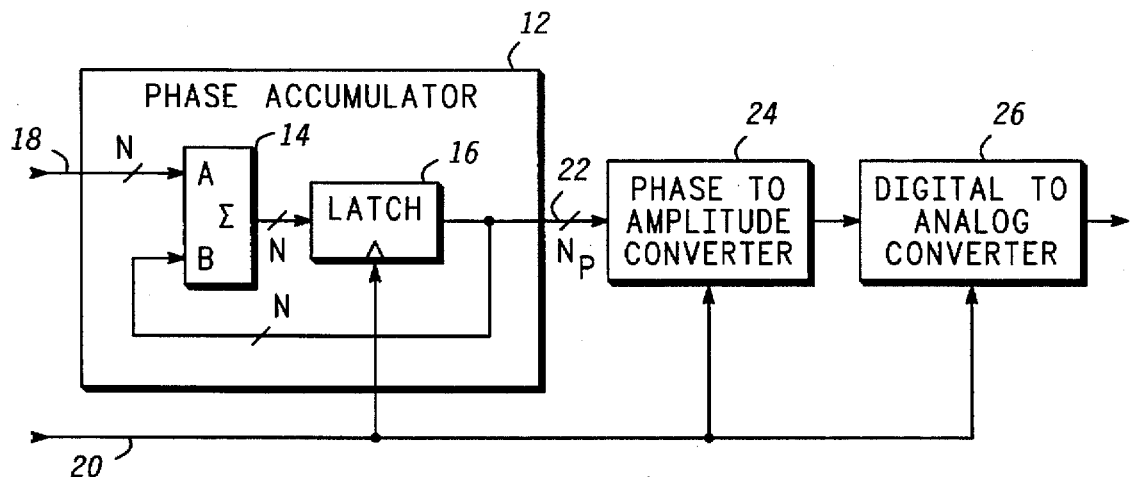
FIG. 1 <u>10</u>
*(PRIOR ART)*
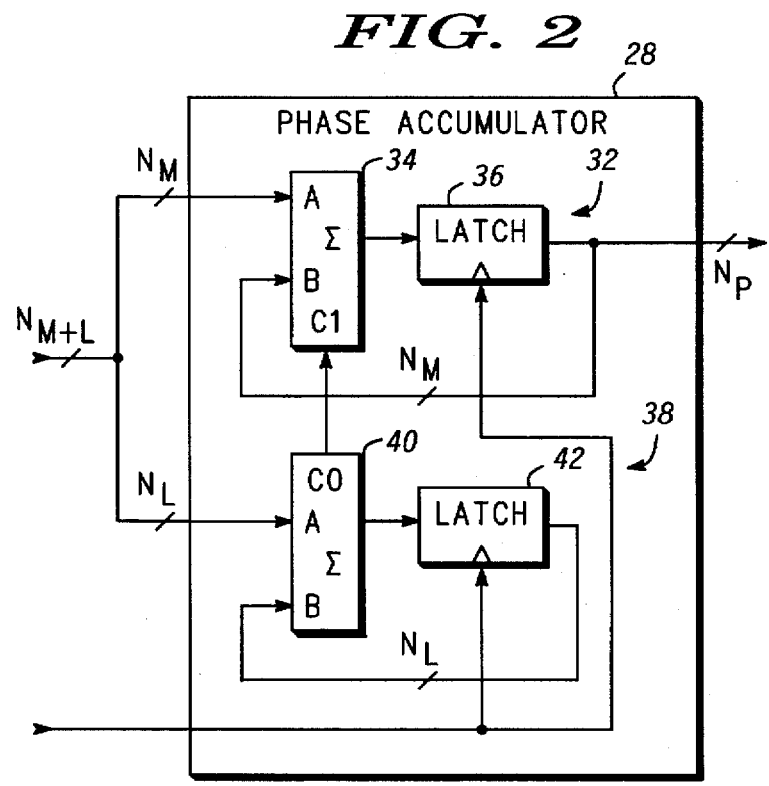
FIG. 2

METHOD AND APPARATUS FOR NUMERICALLY CONTROLLED OSCILLATOR WITH PARTITIONED PHASE ACCUMULATOR

FIELD OF THE INVENTION

The present invention relates generally to a numerically controlled oscillator (NCO) or direct digital synthesizer (DDS) having a phase accumulator partitioned into high speed and low speed stages.

BACKGROUND OF THE INVENTION

Frequency synthesizers generate signals which exhibit frequencies specified in response to controlling inputs. In many situations, the generated signals are sinusoidal waveforms, and the controlling inputs are digital words.

One conventional technique for performing frequency synthesis employs a phase-locked loop (PLL) design. PLL synthesizers have been refined to the point where they can synthesize a relatively pure output sine wave, throughout a wide bandwidth with limited frequency resolution, and at relatively low power.

However, PLL synthesizers suffer from a slow tuning speed when frequency resolution and output purity are important. In other words, PLL synthesizers often require an undesirably long duration to change from synthesizing one frequency to synthesizing another frequency. The tuning speed is related to an integer multiple of the minimum frequency step such that the combination of output purity, fine frequency resolution and fast tuning speed is often difficult to achieve. In addition, more and more synthesizer applications require a very high degree of frequency accuracy and/or a very wide percentage bandwidth which are difficult to achieve with PLL synthesizers. Moreover, PLL synthesizers often suffer from noise sensitivity, drifts, offsets, and other undesirable features characteristic of analog circuits.

Numerically controlled oscillator (NCO) synthesizer designs provide a solution to many of the PLL synthesizer problems. NCO synthesizers are digital devices which instantly tune to new frequencies, can easily be configured to accommodate a very high frequency resolution and accuracy over a very wide percentage bandwidth, and do not suffer the noise sensitivity, drift, offset, and other undesirable features characteristic of analog circuits. When implemented with high speed digital technology or when combined with a PLL synthesizer of low frequency resolution, the NCO can provide this solution over a very wide frequency bandwidth. The output of the NCO synthesizer may be used directly in its digital form in digital signal processing (DSP) applications or converted to the analog domain through use of a digital to analog converter (DAC).

Unfortunately, these desirable benefits of NCO synthesizers are conventionally achieved by designs which consume an undesirably high amount of power. In many applications, such as in satellites and battery-powered communication equipment, the high power consumption characteristic of conventional NCOs poses a serious problem.

The high power consumption of a conventional NCO is caused by a combination of many factors. Clock speed and overall fast operation in a phase accumulator portion of the NCO represent one of these factors. Generally speaking, the higher the clock speed and the faster the operation, the greater the frequency range over which the NCO can be tuned and the higher the maximum frequency obtainable by the NCO. Generally, the greater the size and complexity of the phase accumulator that is clocked at this speed, the greater the frequency resolution obtainable by the NCO. However, higher clock speeds, larger accumulators, and faster operation cause the NCO to consume more power.

Accordingly, a need exists for an NCO which achieves the high performance characteristic of operating a phase accumulator at a high clock speed but which has improved power consumption, particularly if the NCO may often achieve a reduction in accumulator complexity.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a block diagram of a prior art NCO;

FIG. 2 shows a first phase accumulator for an NCO; and

DETAILED DESCRIPTION OF THE DRAWINGS

Figure 3:
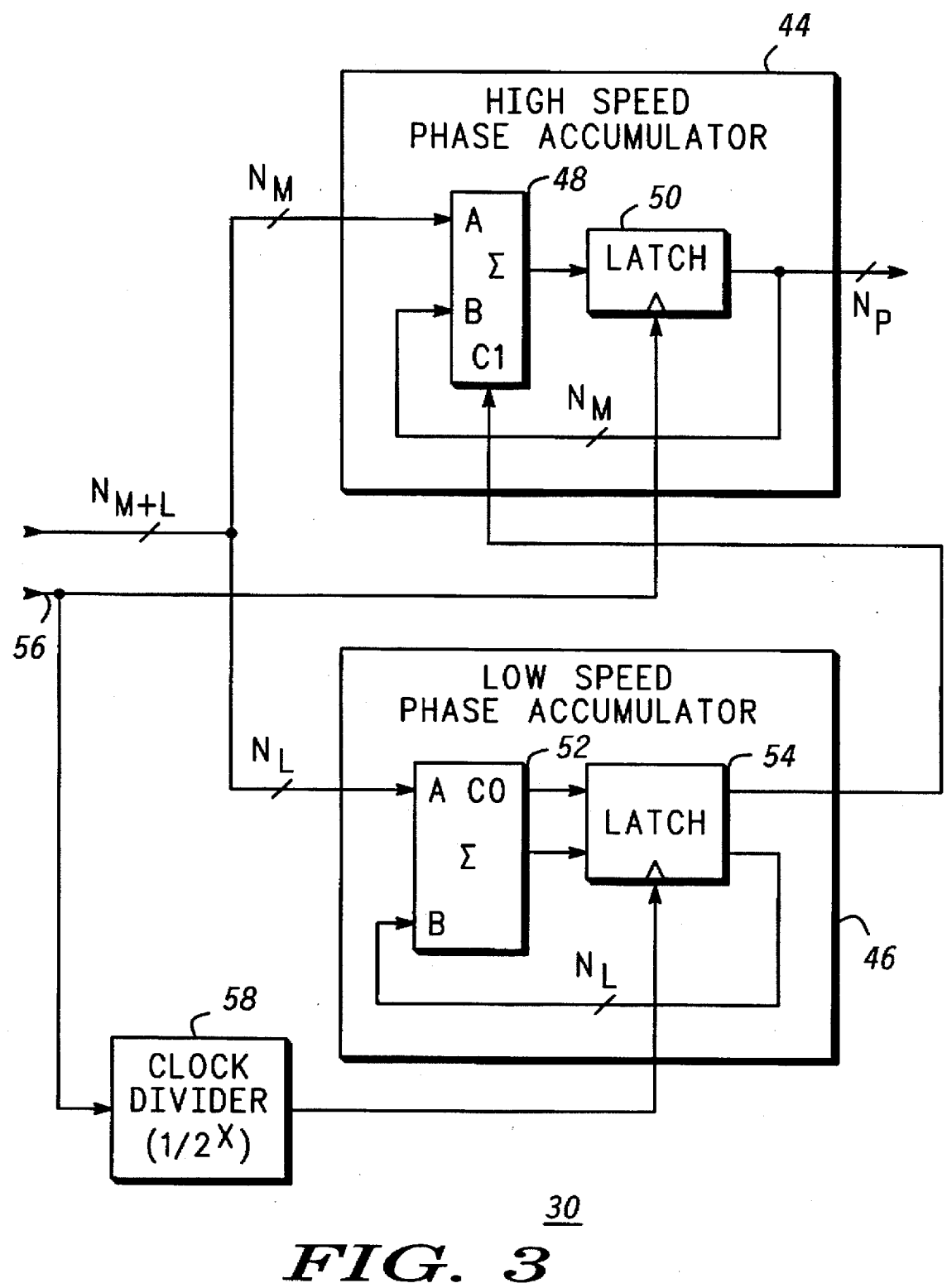
FIG. 3 shows a second phase accumulator for an NCO.

FIG. 1 shows a block diagram of an NCO 10 which conforms to conventional design techniques. NCO 10 includes a phase accumulator 12. FIG. 1 also shows a block diagram of a conventional phase accumulator design. Phase accumulator 12 includes an adder 14 and a latch 16. An input port 18 of phase accumulator 12 couples to "A" inputs of adder 14. Input port 18 receives an N bit wide frequency word, where N is an integer number typically in the range of 24–48. An N bit wide output of adder 14 couples to an input of an N bit wide latch 16, and an N bit wide output from latch 16 is fed back to "B" inputs of adder 14. A high speed clock is applied at a circuit or port 20 of NCO 10, and port 20 couples to a clock input of latch 16.

Phase accumulator 12 performs a modulo 360 degrees accumulation operation to specify, for each clock period, a phase value for an output signal from NCO 10. The frequency word applied at port 18 defines the phase or accumulation step size. An accumulation period equals one complete cycle of the high speed clock. During each accumulation period, phase accumulator 12 adds a previously accumulated phase to the phase step size defined by the frequency word. The addition is performed modulo 360 degrees. The result of this addition operation is saved as accumulated phase for the next accumulation period, and a portion of the accumulation results are output from phase accumulator 12 for conversion into an amplitude sample.

Accumulation operation after accumulation operation may be performed in sequence for as long as an NCO waveform output is desired. The frequency word may be held constant for as long as desired or changed as desired to modulate frequency. The accumulation results output from phase accumulator 12 represent a stream of data words, with a new data word being produced for each accumulation period. Larger frequency words cause phase to increase by a greater amount each accumulation period. Accumulation periods are desirably as short as possible and the N bit width of the accumulator as great as possible so that higher frequencies and greater frequency resolution over wider frequency ranges may be produced.

Other conventional phase accumulator architectures are known to those skilled in the art. For example, pipe-lined designs may be devised to compute carries over the N bit wide addition operation more quickly so that phase accumulator 12 may operate with even shorter accumulation periods.

Phase accumulator 12 generates its stream of digital phase words from an output port 22. Port 22 couples to a phase to amplitude converter (PAC) 24. Typically, the PAC produces either in-phase and quadrature amplitude components, or simply one phase. PAC 24 couples to a digital to analog (D/A) converter 26, or in many applications couples to a DSP component such as a digital down converter. PAC 24 typically includes one or more look-up tables which are directly or indirectly indexed or addressed by the phase words generated by phase accumulator 12. PAC 24 generates a new digital amplitude sample during each accumulation period. D/A converter 26 converts the digital amplitude samples into an output analog signal. Although not shown, a low pass filter typically couples to the output of D/A 26 to filter this analog signal.

As discussed above, only a portion of the N bit wide phase word produced by phase accumulator 12 during an accumulation period is typically converted into an amplitude sample. In order to minimize the size and power consumption of PAC 24 and to comply with practically attainable levels of precision achievable by D/A converter 26, only the most significant Np bits from the N bit wide phase word are used to produce an amplitude sample. Typically, $N_p$ is an integer number in the range of 8–16, but is often smaller in integrated DSP applications.

Phase accumulator 12 needs to accumulate phase to a much higher level of precision than is needed for generating an amplitude sample to achieve high levels of frequency accuracy and resolution. The accumulation operation causes phase errors in any one accumulation period due to truncation of the N bit wide phase word to $N_p$ bits to constructively combine or accumulate with phase errors from subsequent accumulation periods. Thus, while waveform amplitude samples may exhibit a precision consistent with an 8–16 bit numbering system, waveform frequency resolution is typically determined to a precision consistent with a 24–48 bit numbering system.

Accordingly, FIG. 1 illustrates a conventional NCO 10 in which phase accumulates within an N bit wide numbering system which is many bits wider than the $N_p$ bits used to generate amplitude samples. Moreover, phase accumulates at a fast rate defined by a high speed clock. The high speed accumulation within an N bit wide numbering system leads to undesirably high power consumption. The phase word output at any given clock cycle may be expressed as:

$$P_{OUT}=TRUN_P(MOD(A+P*Z_F)), \quad \text{EQ. 1}$$

where $P_{OUT}$=the output phase data word, $TRUN_P()$=a truncation function to P bits, $MOD()$=a modulo function, A=a phase initial value, P=the accumulation step size, and $Z_F$=the number of fast clock periods.

FIG. 2 illustrates a block diagram of a phase accumulator 28 and FIG. 3 illustrates a block diagram of a phase accumulator 30, either of which may substitute for phase accumulator 12 (see FIG. 1). Phase accumulator 30 is an improvement over either phase accumulator 12 or 28 because it consumes less power, or alternatively achieves higher frequency resolution for a given power consumption. Phase accumulator 28 and phase accumulator 30 each split the N bit wide frequency word into $N_M$ more significant bits and $N_L$ less significant bits.

Before discussing phase accumulators 28 and 30 further, EQ. 1 may be rewritten to reflect the division of phase representation into more significant (MS) and less significant (LS) bits as follows:

$$P_{OUT}=TRUN_P(MOD((A_M+P_M*Z_F)+(A_L+P_L*Z_F))), \quad \text{EQ. 2}$$

where $A_M$=MS bits of the initial phase value, $A_L$=LS bits of the initial phase value, $P_M$=MS bits of the accumulation step, and $P_L$=LS bits of the accumulation step.

EQ. 2 shows that the MS portion of phase accumulation may be accumulated separately from the LS portion of phase accumulation, with the results of the separate accumulations added together.

The preferred embodiments of the present invention slow the clock period for the LS portion of the phase accumulation so that $Z_S=Z_F/2^X$, where X is an integer number, and $Z_S$ is the number of periods of a slow speed clock that oscillates at $\frac{1}{2}^X$ times the high speed clock's frequency. The slowed clock period for the LS portion of phase accumulation allows the LS portion to operate with lower power consumption. Thus, the slower clock of the LS portion of phase accumulation may account for in EQ. 2 as follows:

$$P_{OUT}=TRUN_P(MOD((A_M+P_M*Z_F)+(A_L+P_L*Z_S*2^X))) \quad \text{EQ. 3}$$

Multiplication by $2^X$ is performed easily and at low power using digital hardware. For example, a multiplication by $2^X$ may be achieved by shifting a digital word X bits toward more significance. EQ. 3 illustrates a feature of the preferred embodiments wherein the MS portion of phase accumulation is accumulated separately from the LS portion of phase accumulation, the LS portion is accumulated at a slow speed, and the results of the separate accumulations are added together after shifting the LS accumulation X bits toward more significance. This feature is discussed in more detail below in connection with FIG. 3.

Referring to FIG. 2, phase accumulator 28 illustrates another feature of the preferred embodiments. Generally, phase accumulator 28 splits the frequency word or phase step size into $N_M$ and $N_L$ bits in such a manner that the total number of bits $N=N_M+N_L$. In other words, no bits of the frequency word are common to both the $N_M$ and $N_L$ groups. Moreover, the number of bits accumulated within the $N_M$ group is greater than or equal to the number of bits ($N_p$) included in the output phase word. As the number of bits accumulated in $N_M$ approaches $N_p+x$, the spurious performance of the accumulator approaches that of a conventional high speed accumulator.

A more significant stage 32 of phase accumulator 28 includes an adder 34 and a latch 36. The $N_M$ most significant bits from the frequency word couple to "A" inputs of adder 34, an output of adder 34 couples to an input of latch 36, and an output of latch 36 couples to "B" inputs of adder 34. The most significant $N_p$ of the $N_M$ accumulated bits are used as an output from phase accumulator 28. A less significant stage 38 of phase accumulator 28 includes an adder 40 and a latch 42. The $N_L$ less significant bits from the frequency word couple to "A" inputs of adder 40, an output of adder 40 couples to an input of latch 42, and an output of latch 42 couples to "B" inputs of adder 40. In this embodiment, both of stages 32 and 38 are clocked by a common high speed clock. A carry output (CO) from less significant adder 40 couples to a carry input (C1) of more significant adder 34.

In phase accumulator 28, the frequency word and stages 32 and 38 are configured so that no bits of equal significance are accumulated in both of stages 32 and 38. Consequently, the only influence less significant stage 38 has on more significant stage 32 is through a carry signal. Those skilled in the art will appreciate that a carry signal is asserted or activated when the sum of two numbers being added in stage 38 equals or exceeds the base of the number system supported by stage 38. When active, the carry signal causes the value of one to be added to the least significant bit being accumulated in more significant stage 32. Otherwise, stages 32 and 38 operate independently from one another.

Thus, less significant stage 38 exerts no influence on more significant stage 32 when the carry signal is not asserted. Furthermore, since $N_p < N_M$ the less significant stage 38 has no influence over the value of the data word output from phase accumulator 28 unless the carry signal is activated and the value of the least significant bits being accumulated in stage 32 just so happens to allow the carry to ripple or otherwise propagate into the least significant one of the $N_p$ output bits.

Accordingly, in another feature of the preferred embodiments, accumulation is partitioned so that less significant accumulation stage 38 operates independently from more significant accumulation stage 32, except for the occasional influence exerted by a carry signal between stages 38 and 32.

The slower clock speed used for the LS accumulation stage causes the carry signal C to be asserted for $2^X$ clock cycles rather than in accordance with a time scale consistent with $Z_F$. In other words, the LS accumulation stage performs accumulations only at integral values for $Z_S$ and maintains such accumulations for an entire slow speed accumulation period. Over many clock cycles, the portion of the time that the carry signal is asserted is the same as would occur in a conventional accumulator.

In one embodiment of the present invention (not shown), accumulation is partitioned so that less significant accumulation operates independently from more significant accumulation, except for the occasional influence exerted by a carry signal between the LS stage and the MS stage, as shown in FIG. 2. However, the LS stage is clocked at $\frac{1}{2}^X$ times the clock rate for the MS stage. Once every $2^X$ high speed clock cycles the carry signal is added into a bit having significance of $2^X$ in the MS stage. This is bit number X+1 counting from the least significant bit of the MS stage. This embodiment uses an enabling circuit which passes the carry signal to the MS stage only once every $2^X$ high speed accumulation periods.

Referring to FIG. 3, phase accumulator 30 illustrates yet another embodiment of the present invention. Phase accumulator 30 includes a high speed phase accumulator 44 and a low speed phase accumulator 46. High speed phase accumulator 44 includes an adder 48 and a latch 50. The $N_M$ most significant bits from the frequency word couple to "A" inputs of adder 48, an output of adder 48 couples to an input of latch 50, and an output of latch 50 couples to "B" inputs of adder 48. The most significant $N_p$ of the $N_M$ accumulated bits are used as an output from phase accumulator 30. Low speed phase accumulator 46 includes an adder 52 and a latch 54. The $N_L$ least significant bits from the frequency word couple to "A" inputs of adder 52, an output of adder 52 couples to an input of latch 54, and an output of latch 54 couples to "B" inputs of adder 52.

A high speed clock supplying circuit or port 56 couples to a clock input of latch 50 in high speed phase accumulator 44 and to an input of a clock divider circuit 58. An output of clock divider circuit 58 couples to a clock input of latch 54 in low speed phase accumulator 46. Clock divider circuit 58 is configured to generate a low speed clock signal having a frequency $\frac{1}{2}^X$ times the frequency of a high speed clock signal received at port 56.

A carry output (CO) from adder 52 in low speed phase accumulator 46 couples to a data input of latch 54, and a corresponding data output of latch 54 couples to a carry input (C1) of adder 48 in high speed phase accumulator 44. The carry input of adder 48 causes the value of the carry signal (either 0 or 1) to be added into the $2^0$ bit position (i.e. least significant bit) of adder 48.

As set forth above in EQ. 3, when the LS stage is clocked at a rate of $\frac{1}{2}$ times the clock rate for the MS stage, the influence of the LS stage upon the MS stage is $C*2^X$. In other words, the carry signal from the LS stage has a level of significance in the MS stage equivalent to bit number X+1. However, an enabling circuit is needed to compensate for the carry signal operating on a time scale that is $2^X$ times slower then the time scale used in the MS stage.

Phase accumulator 30 takes advantage of the fact that $C*2^X=C_I$ over a range of I=1 to $2^X$. In other words, $C*2^X$ equals C added to itself $2^X$ times. Phase accumulator 30 adds carry signal C into high speed phase accumulator 44 at a significance level of $2^0$ rather than at a significance level of $2^X$. Since the carry signal operates on a time scale that is $2^X$ times slower then the time scale used in high speed phase accumulator 44, the carry signal gets added to itself $2^X$ times to achieve the same influence.

In addition, phase accumulator 30 is desirably configured so that the width $N_p$ of the output data word plus X is less than or equal to the width $N_M$ of the high speed phase accumulator 44. This allows the carry signal influence to occur beneath the precision of the output data word. Consequently, frequency spurs remain low, and the output data word stream behaves substantially as though low speed phase accumulator 46 were clocked at a high speed.

In summary, the present invention provides an improved NCO. The NCO of the present invention has lower power consumption because a portion of a phase accumulator accumulates at a slow rate. This slow rate portion of the phase accumulator may be achieved with less complex circuits since a high speed NCO accumulator typically requires a special architecture optimized for speed. The NCO of the present invention attains this lower power consumption while performing in a matter consistent with operating an entire phase accumulator at a fast rate.

The present invention has been described above with reference to preferred embodiments. However, those skilled in the art will recognize that changes and modifications may be made in these preferred embodiments without departing from the scope of the present invention. For example, those skilled in the art will appreciate that different phase accumulator architectures may be substituted for the simple architecture described herein. These and other changes and modifications which are obvious to those skilled in the art are intended to be included within the scope of the present invention.

What is claimed is:

1. A numerically controlled oscillator (NCO) for generating an oscillation signal having a frequency determined in response to a frequency word having more significant bits and having less significant bits, said NCO comprising:

a first phase accumulator adapted to accumulate at a first rate and to receive said more significant bits of said frequency word; and a second phase accumulator, coupled to said first phase accumulator, said second phase accumulator being adapted to accumulate at a second rate, said second rate being less than said first rate, and to receive said less significant bits of said frequency word.

2. An NCO as claimed in claim 1 wherein:

said first phase accumulator has an output; and said NCO additionally comprises a phase to amplitude converter having an input coupled to said first phase accumulator output.

3. An NCO as claimed in claim 2 wherein:
said first phase accumulator performs modulo accumulation using an $N_M$ bit numbering system, where $N_M$ is an integer number;
said phase to amplitude converter receives $N_p$ bits from said first phase accumulator output, where $N_p$ is an integer number; and
$N_p$ is less than $N_M$.

4. An NCO as claimed in claim 3 wherein:
said first rate is at most $2^X$ times said second rate, where X is an integer number.

5. An NCO as claimed in claim 1 wherein:
said frequency word is defined using $N_M$ plus $N_L$ bits, where $N_M$ and $N_L$ are integer numbers, $N_M$ equals the number of said more significant bits in said frequency word, and $N_L$ equals the number of said less significant bits in said frequency word; and
said first phase accumulator performs modulo accumulation within at least an $N_M$ bit numbering system.

6. An NCO as claimed in claim 5 wherein said second phase accumulator performs modulo accumulation within at least an $N_L$ bit numbering system.

7. An NCO as claimed in claim 6 wherein:
said second phase accumulator generates a carry signal; and
said carry signal is supplied to said first phase accumulator.

8. An NCO as claimed in claim 7 wherein:
said first phase accumulator performs a sequence of accumulation operations in which each accumulation operation takes place during an accumulation period determined in response to said first rate;
when said carry signal activates, said carry signal remains active for a plurality of said accumulation periods; and
said first phase accumulator adds said carry signal to a least significant one of said $N_M$ bits of said frequency word.

9. An NCO as claimed in claim 1 additionally comprising:
a clock supplying circuit coupled to said first phase accumulator; and
a clock divider having an input coupled to said clock supplying circuit and having an output coupled to said second phase accumulator.

10. A method for tracking phase in a numerically controlled oscillator (NCO), said phase being tracked in response to a frequency word having more significant bits and having less significant bits, and said method comprising the steps of:
a) accumulating a first phase value by a step size determined in response to said more significant bits of said frequency word and at a first accumulation rate; and
b) accumulating a second phase value by a step size determined in response to said less significant bits of said accumulation word and at a second accumulation rate, said second accumulation rate being less than said first accumulation rate.

11. A method as claimed in claim 10 wherein:
said step a) generates a stream of data words which are $N_M$ bits wide, where $N_M$ is an integer number;
said method additionally comprises the step of converting $N_P$ of said $N_M$ bits of said data words into an amplitude signal, where $N_P$ is an integer number; and
$N_P$ is less than $N_M$.

12. A method as claimed in claim 11 wherein:
said first accumulation rate is at most $2^X$ times said second accumulation rate, where X is an integer number.

13. A method as claimed in claim 10 wherein:
said frequency word is defined using $N_M$ plus $N_L$ bits, where $N_M$ and $N_L$ are integer numbers, $N_M$ equals the number of said more significant bits in said frequency word, and $N_L$ equals the number of said less significant bits in said frequency word; and
said step a) generates a stream of data words which are at least $N_M$ bits wide.

14. A method as claimed in claim 13 wherein said step b) generates a stream of data words which are at least $N_L$ bits wide.

15. A method as claimed in claim 14 wherein:
said step b) comprises the step of generating a carry signal; and
said step a) is responsive to said carry signal.

16. A method as claimed in claim 15 wherein:
said step a) comprises the step of performing a sequence of accumulation operations in which each accumulation operation takes place during an accumulation period determined in response to said first accumulation rate;
when said step of generating a carry signal asserts said carry signal, said carry signal remaining asserted for a plurality of said accumulation periods; and
said step a) additionally comprises the step of adding said carry signal to a least significant one of said $N_M$ bits of said frequency word.

17. A method as claimed in claim 10 additionally comprising the steps of:
supplying a first clock signal oscillating at said first accumulation rate to drive said step a); and
dividing said first clock signal to produce a second clock signal oscillating at said second accumulation rate to drive said step b).

18. A numerically controlled oscillator (NCO) for generating an oscillation signal having a frequency determined in response to a frequency word having more significant bits and having less significant bits, said NCO comprising:
a clock supplying circuit;
a first phase accumulator coupled to said clock supplying circuit, said first phase accumulator being adapted to receive said more significant bits of said frequency word;
a clock divider having an input coupled to said clock supplying circuit and having an output; and
a second phase accumulator, coupled to said clock divider output, said second phase accumulator being adapted to receive said less significant bits of said frequency word.

19. An NCO as claimed in claim 18 wherein:
said first phase accumulator has an output and performs modulo accumulation using an $N_M$ bit numbering system, where $N_M$ is an integer number;
said NCO additionally comprises a phase to amplitude converter having an input adapted to receive $N_P$ bits from said first phase accumulator output, where $N_P$ is an integer number; and
$N_P$ is less than $N_M$.

20. An NCO as claimed in claim 19 wherein:
said clock divider output generates a clock signal oscillating no less than $½^X$ times an oscillation rate of an oscillation signal provided by said clock supplying circuit to said first phase accumulator, where X is an integer number.

* * * * *